(12) United States Patent
Adragna

(10) Patent No.: US 7,902,804 B2  
(45) Date of Patent: Mar. 8, 2011

(54) METHOD AND RELATED CIRCUIT FOR PROTECTION AGAINST MALFUNCTIONING OF THE FEEDBACK LOOP IN SWITCHING POWER SUPPLIES

(75) Inventor: Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1206 days.

(21) Appl. No.: 11/523,774

(22) Filed: Sep. 18, 2006

(65) Prior Publication Data

US 2007/0070663 A1 Mar. 29, 2007

Related U.S. Application Data

(63) Continuation of application No. PCT/EP2005/050880, filed on Mar. 1, 2005.

(30) Foreign Application Priority Data

Mar. 18, 2004 (IT) .............................. MI2004A0517

(51) Int. Cl.
  *G05F 1/575* (2006.01)
  *H02H 7/00* (2006.01)
(52) U.S. Cl. ........................................ 323/284; 361/18
(58) Field of Classification Search .................. 323/265, 323/282, 283, 284; 363/50, 55; 361/18
See application file for complete search history.

(56) References Cited

U.S. PATENT DOCUMENTS

| | | | |
|---|---|---|---|
| 5,349,523 A * | 9/1994 | Inou et al. | 363/97 |
| 5,491,794 A * | 2/1996 | Wu | 714/23 |
| 5,796,596 A * | 8/1998 | Williams | 363/21.16 |
| 6,337,788 B1 * | 1/2002 | Balakrishnan et al. | 361/86 |
| 6,480,043 B2 * | 11/2002 | Hall et al. | 327/108 |
| 6,580,593 B2 * | 6/2003 | Balakrishnan | 361/97 |
| 2001/0043091 A1 | 11/2001 | Hall et al. | |
| 2002/0181179 A1 | 12/2002 | Balakrishnan et al. | |

FOREIGN PATENT DOCUMENTS

WO 2005091481 A1 9/2005

* cited by examiner

*Primary Examiner* — Gary L Laxton
(74) *Attorney, Agent, or Firm* — Lisa K. Jorgenson; Robert Iannucci; Seed IP Law Group PLLC

(57) ABSTRACT

A method and the related circuit protect against malfunctioning of the feedback loop in switching power supplies. More particularly, the circuit identifies a condition of excessively high voltage at the output. In one embodiment the circuit for the protection against malfunctioning of the feedback loop of a switching power supply comprises: circuitry that generates a voltage proportional to the output voltage of the switching power supply; a comparator for comparing the voltage proportional to the output voltage with a reference voltage; a counter coupled to the comparator and capable of supplying an output signal when said voltage proportional to the output voltage exceeds said reference voltage a threshold number of times; said output signal is indicative of a malfunctioning of the feedback loop.

15 Claims, 3 Drawing Sheets

METHOD AND RELATED CIRCUIT FOR PROTECTION AGAINST MALFUNCTIONING OF THE FEEDBACK LOOP IN SWITCHING POWER SUPPLIES

BACKGROUND OF THE INVENTION

1. Field of the Invention

The present invention refers to switching power supplies, and especially to a method and the related circuit for protection against malfunctioning of the feedback loop in switching power supplies. More in particular it relates to a circuit for the identification of a condition of excessively high voltage at the output.

The proposed system, even if it finds more direct application in offline converters, and especially in those that use the flyback topology, can also be applied to non-insulated converters and to all the other topologies (boost, buck, forward, etc.) with suitable modifications. Of notable practical interest is the extension of the system to the boost topology, and particularly in the so-called PFC (power factor corrector) pre-regulators, that is forced switching systems whose task is to absorb from the mains an almost sinusoidal current that is in phase with the mains voltage.

2. Description of the Related Art

One of the peculiarities of the offline converters is that they nearly always present the so-called insulation barrier, that is to be constituted by two galvanically separated parts. One side so-called primary, connected to the mains by means of a rectifier bridge and comprising a switch (typically a MOSFET), whose opening and closing is suitably driven so as to regulate the power flow, and almost always the control part. One side so-called secondary, isolated from the primary and connected by means of its output gate to the load to be powered.

The galvanic insulation, requested by safety regulations, is ensured by the presence of a transformer. The transformer, constructed so as to supply adequate insulation, prescribed by the regulations, permits the passage of the energy from one side to the other for magnetic coupling, without metallic contact between them.

In such converters the output voltage typically is regulated, that is kept at a constant value upon variation of the operative conditions (input voltage, output current, temperature). This objective is achieved by resorting to feedback control: the output voltage, or more often a portion thereof, is compared with a reference voltage; their difference is suitably amplified (error signal) and elaborated by a control circuit (controller) with the purpose of determining the turn-on and turn-off times of the switch so as to zero or minimize the above-mentioned error signal.

At this point, in offline converters, a problem is presented: the output voltage is on the secondary side while the control and the MOSFET are on the primary side. It is therefore necessary to transfer the information on the output voltage from one side to the other, that is, it is necessary to cross the insulation barrier in the opposite direction and, in accordance with the safety regulations, it is necessary to guarantee at least the same insulation of the transformer. The solution to this problem consists in using another small transformer or a photocoupler.

In case of breakdown of the feedback loop, the control circuit loses the information on the output voltage and it follows that the converter delivers more power than that required by the load and the output voltage starts to increase out of control in a short time leading to the destruction of the load powered by the converter as well as the converter itself.

It is thus necessary to provide for means that, in the case of breakdown of the feedback loop block the converter preventing the output voltage from going out of control.

Should some of the circuit components used for setting the output voltage at the desired value (typically of resistors) deteriorate through ageing so that a higher output voltage takes place, perhaps slowly growing in time, an eventual control system of the integrity of the feedback loop might not detect the drift of the output voltage or detect it when the voltage has reached very high values and therefore not prevent a catastrophic breakdown.

Therefore a monitoring system of the output voltage is needed that acts in parallel to the feedback loop and which, should the latter no longer control the output voltage for any reason whatsoever and the output voltage tends to increase, intervenes blocking the converter when it exceeds a preset safety limit. This function is commonly indicated with the name of OVP (over voltage protection).

In the case of pre-regulators PFC which in their most typical form use the boost topology, which is not isolated, and that therefore does not present the problem of crossing the insulation barrier, different needs, strictly linked to the safety of the application, lead to the same need. A pre-regulator PFC, in fact, generates a direct output voltage starting from the rectified and non-filtered mains voltage (rectified sinusoid). The output voltage is greater than the maximum mains peak voltage, that is typically equal to 400V. To lose control of such a high voltage would have catastrophic effects.

With reference to the offline converters, there are different known solutions to the problem outlined above, all of which can be organized into two fundamental categories: that in which the output voltage is measured directly and indirectly.

The solutions belonging to the first category provide a very precise level of intervention and can be applied to any topology of converter. However, as has already been observed for the feedback, they require the insulation barrier to be crossed.

When high precision is not required, resort is made to the indirect reading of the output voltage. In the flyback configuration this is particularly easy as during the time in which the switch is off, the output voltage is applied to the secondary winding of the transformer, therefore it is found at the terminals of all the other windings multiplied by the respective turn ratios. Usually an auxiliary winding Vaux is used, with suitable polarity, together with rectifier diode and a capacitor to derive a direct voltage Vcc destined to power the integrated control circuit during the operation of the converter. This voltage, because of what was said before, is ideally proportional to the output voltage, that is regulated, and thus stable.

If the feedback loop breakdown making the output voltage increase out of control, this increase would be reflected by a similar increase of the voltage Vcc. A comparator can thus activate the protection when the supply voltage Vcc exceeds a preset value. The system is very simple and economical but it is rather imprecise. The voltage Vcc, even though it is well stabilized upon the variation of the input voltage of the converter, is not upon the variation of the load. This is mainly caused by the parasite parameters of the transformer.

In the case of pre-regulators PFC, in addition to the obvious possibility of direct reading of the output voltage, there is a series of techniques for verifying the integrity of the feedback loop, more easily applicable to the controllers fitted with error amplifier of the transconductance type.

Direct reading permits not only, as already mentioned, maximum precision of the intervention threshold of the protection but also maximum safety (in the hypothesis, provided for by the safety regulations, of single breakdown). In fact the protection is activated whatever the cause is that generates the over-voltage, whether it be the breaking of the loop, or whether it be deterioration. Against direct reading the use of a pin is required, of the integrated circuit dedicated, and of a second resistive divider in addition to that used for the feedback loop. In addition to the increase in the number of components outside the controller, the second divider dissipates a certain quantity of power which, for as small as it is, in the systems where compliance to the most recent regulations regarding the reduction of consumption of equipment in non operative conditions is requested (for example EnergyStar, Energy2000, Blue Angel, etc.), can represent an undesired contribution that cannot be disregarded.

The techniques for verification of the integrity of the feedback loop, on the other hand, do not generally require the use of a dedicated pin or additional external components, but they do not offer a level of protection that is just as complete, as they are unable to identify movements of the regulation point due to slow deterioration of the loop. Each single time, according to the needs of the specific application, one or the other technique can be preferable.

BRIEF SUMMARY OF THE INVENTION

One embodiment of the present invention is a method and the related circuit for protection against malfunctioning of the feedback loop in switching power supplies, especially for the identification of a condition of excessively high voltage at the output, that permits the difficulties of the known art to be overcome. In addition, it has a minimum number of external components, provides an intervention of protection that does not depend completely on the load conditions of the converter, has precision comparable to that of the systems with direct reading of the output voltage, is not very sensitive to external disturbances, and does not introduce additional significant consumption.

One embodiment of the present invention is a circuit for the protection against malfunctioning of the feedback loop of a switching power supply comprising: means for generating a voltage proportional to the output voltage of said switching power supply; a comparator for comparing said voltage proportional to the output voltage with a reference voltage; a counter coupled to said comparator capable of supplying an output signal when said voltage proportional to the output voltage exceeds said reference voltage a preset number of times; said output signal is indicative of a malfunctioning of the feedback loop.

One embodiment of the invention is a method for the protection against malfunctioning of the feedback loop for the protection against malfunctioning of the feedback loop of a switching power supply comprising the steps of: generating a voltage proportional to the output voltage of said switching power supply; comparing said voltage proportional to the output voltage with a reference voltage; counting how many times said voltage proportional to the output voltage exceeds said reference voltage; supplying an output signal, indicative of a malfunctioning of the feedback loop, when the counting of the previous phase has exceeded a preset number.

BRIEF DESCRIPTION OF THE SEVERAL VIEWS OF THE DRAWINGS

The characteristics and advantages of the present invention will appear evident from the following detailed description of an embodiment thereof, illustrated as non-limiting example in the enclosed drawings, in which.

DETAILED DESCRIPTION OF THE INVENTION

Figure 1:
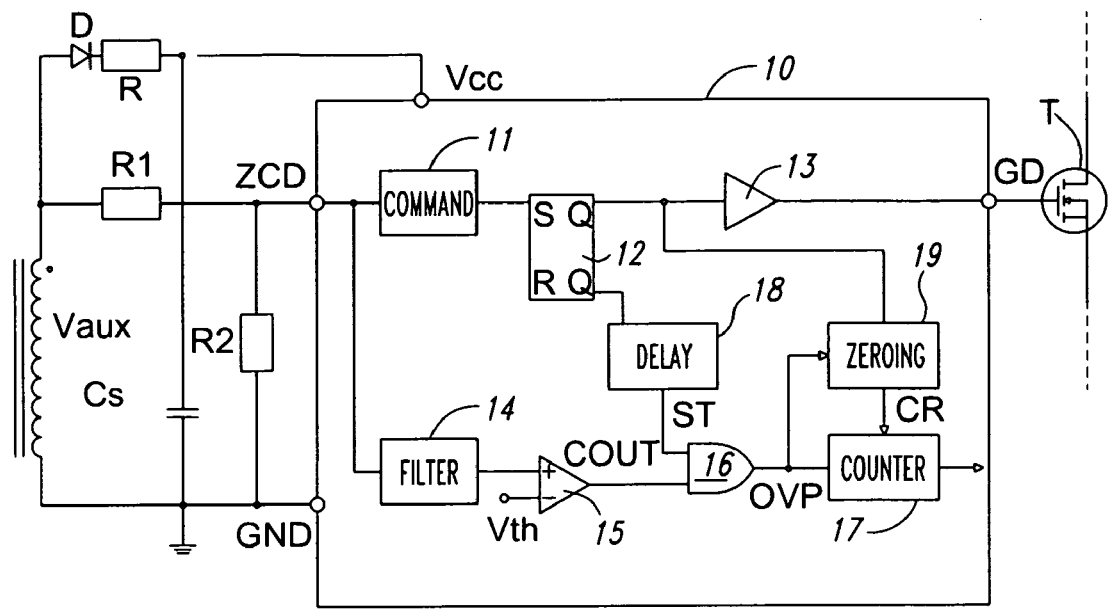
FIG. 1 shows a block diagram of a part of a switching power supply in accordance with one embodiment of the present invention.

In FIG. 1, at one end of the auxiliary winding Vaux of the transformer of the switching power supply a diode D and a resistance R are applied. The diode D and the resistance R supply the voltage Vcc to the control circuit 10. A capacitor Cs filters the voltage Vcc. Still at the end of the winding Vaux a divider of resistances R1 and R2 is applied. The voltage at the intermediate point between R1 and R2 is supplied to the terminal ZCD of the control circuit 10. The other end of the winding Vaux is connected to ground.

The voltage at the terminal ZCD is supplied to a command circuit 11 of the power transistor T of the switching power supply. The output of the command circuit 11 is connected to the input S of a flip-flop 12. The output Q of the flip-flop 12 is connected to a drive circuit 13, which supplies the driving signal GD to the gate of the transistor T.

The voltage at the terminal ZCD is also supplied to a low-pass filter 14, if present and then to the non-inverting input of a comparator 15. At the inverting input of the comparator 15 the reference voltage Vth is applied. The signal Cout in output from the comparator 15 is applied to an input of an AND gate 16, its output signal OVP is applied to a counter 17 (divider for N). The output of the counter 17 is a signal F.

The flip-flop 12 supplies at its output a signal Q and a signal Q-negated. The signal Q-negated is applied to a delay circuit 18, whose output ST is applied to the other input of the AND gate 16. The signal Q is also applied to a zeroing circuit 19 of the counter 17. The signal OVP is also applied to this circuit. The signal CR at the output of the zeroing circuit 19 is applied to the counter 17.

Figure 2:
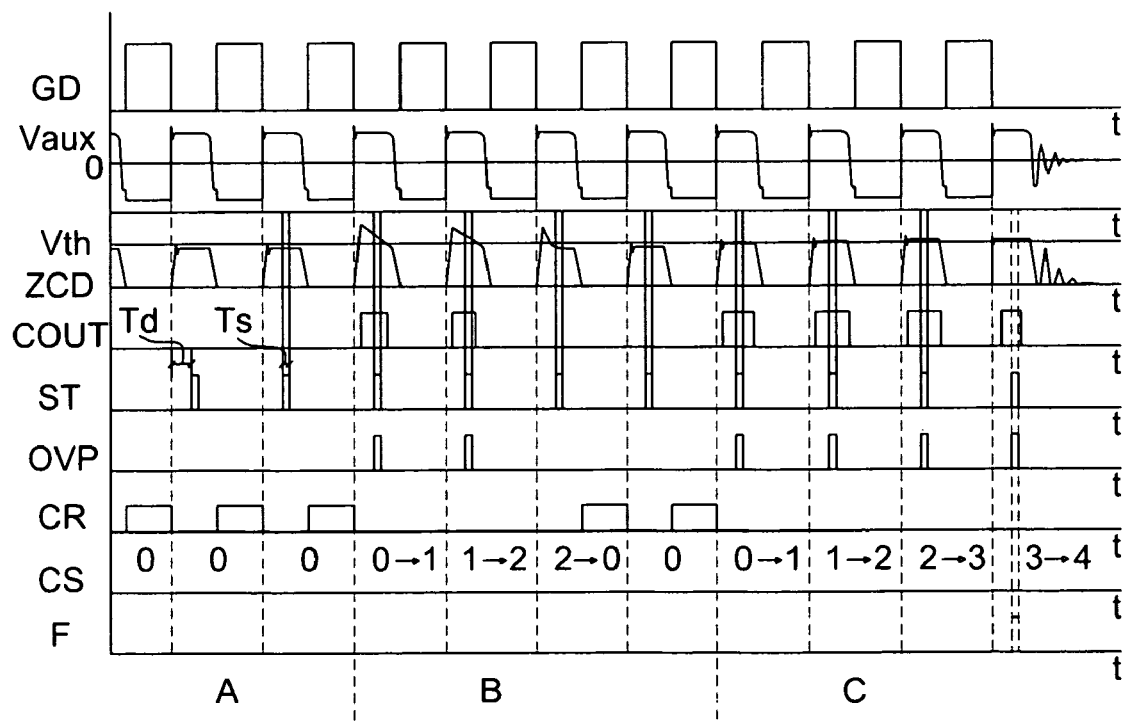
FIG. 2 shows the waveforms present in the circuit of FIG. 1.

FIG. 2 shows the signals GD, Vaux that correspond to the voltage of the winding Vaux, ZCD, COUT, ST, OVP, CR, CS that represent the state of the counter 17, in function of the time and in three cases. Case A, which is a case of normal functioning. Case B, which is a case of temporary disturbance. Case C, which is a case of breakdown.

The control circuit 10 performs sampling, by means of the strobe signal ST of duration Ts, of the output voltage at the switching frequency of the converter. This pulse ST is emitted, by the delay circuit 18, at every switching cycle of the converter with a preset delay Td in relation to the turn-off of the transistor T (because during the turn-off period of the T the voltage at the ends of Vaux carries the information on the output voltage), so as not to consider the pulses present in the voltage at the ends of Vaux. It has a very brief duration Ts so as to reduce the probabilities that a disturbance of sufficient amplitude, injected during the turn-off period of the transistor T, reaches the threshold Vth and activates the comparator 15.

The counter 17 carries out the counting of the number of consecutive switching cycles for which the interrogation of the comparator 15 by means of the strobe pulse ST has supplied as result a voltage at the input of the comparator 15 connected to the winding Vaux greater than Vth. The counter 17 supplies the output signal F when the counting has exceeded a preset number N.

The counter 17 is zeroed, by means of the signal CR, each time the interrogation of the comparator 15 indicates a voltage at the input of the comparator connected to the winding Vaux, which is less than Vth.

The delay circuit 18 preferably supplies a pulse-form signal ST but can also supply a signal having a leading edge after a preset delay Td starting from the trailing edge of the signal GD and a leading edge starting from the leading edge of the signal GD.

As can be seen in FIG. 2, in case A the state of the counter remains always at 0, as the voltage ZCD does not exceed the voltage Vth.

In case B the voltage ZCD exceeds the voltage Vth only twice and then returns to normal levels.

In case C the voltage ZCD has exceeded the voltage Vth four times, and in case the preset number N had been 4, supplies the signal F in output.

The signal F indicates the presence of a breakdown in the power supply and thus is applied to any block circuit (not shown) of the switching power supply, such as for blocking the supply of the control circuit 10, or for short circuiting the gate of the transistor T to ground.

The circuit operates an indirect reading of the output voltage and is totally integrated internally; externally there is no need of any photocoupler. Instead, the divider R1, R2 determines the value of the output voltage that provokes the intervention of the protection. Given that Vaux presents voltages to the order of tens of Volts, the consumption associated to said resistances can be easily made negligible. The voltage read is thus a reproduction, in scale, quite accurate of the output voltage. The precision of the intervention is linked only to the tolerance of the voltage Vth, which can be easily contained within very few percentage points and therefore similar to that of the systems with direct reading of the output voltage. The circuit has high immunity to disturbances: the filtering at the input of the comparator reduces the effect of any residual oscillations that can be present by effect of a coupling of Vaux that has not been carried out with care, the reading of the comparator with the pulse ST reduces the probabilities of capturing a disturbance and, above all, the digital filtering operated by the counter by N, makes it necessary for an eventual disturbance to last for more than N switching cycles of the converter for it to activate the protection.

The value of N is chosen as a compromise between the need for high immunity to noise, that requires high values of N, and the needs both for not excessively complicating the circuit, increasing the number of flip-flops necessary to make the counter, and for not delaying the intervention too long, for not increasing too much the output voltage in the case of real malfunctioning of the feedback loop, for both of which low values of N are needed. For example N can be chosen between 4 and 16.

Figure 3:
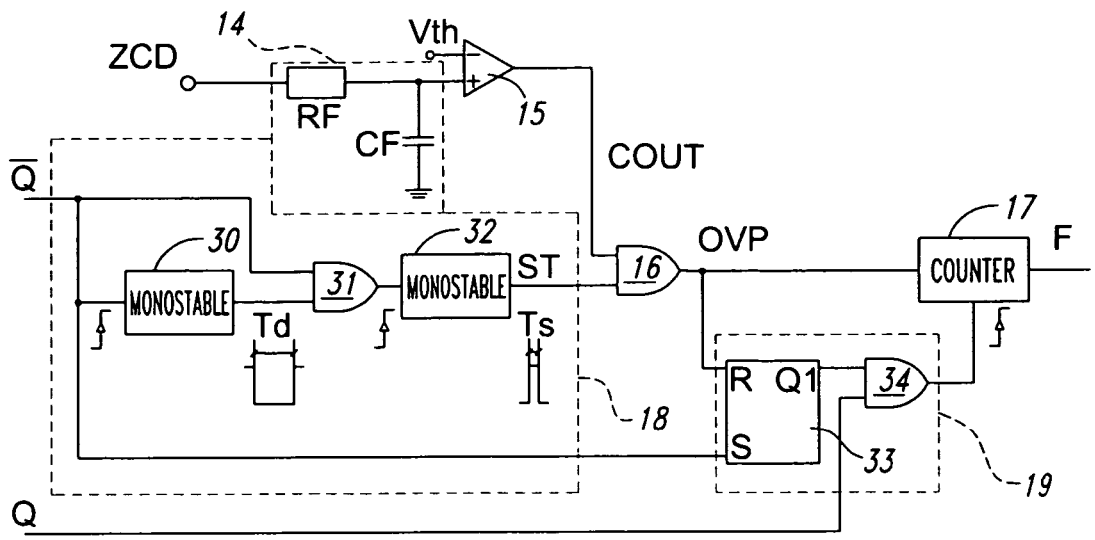
FIG. 3 shows a possible circuit embodiment of the block diagram of FIG. 1.

FIG. 3 shows a possible circuit embodiment of the block diagram of FIG. 1.

The delay circuit 18 is composed of a monostable circuit 30 that receives in input the signal Q-negated, whose output is connected to an input of an AND gate 31. To the other input of the AND gate 31 the signal Q-negated is connected. The output of the AND gate 31 is connected to a monostable circuit 32 whose output is connected to the AND gate 16.

The low-pass filter 14 is formed by a filter RC formed by the resistance Rf and by the capacitor Cf. The zeroing circuit 19 is formed by a flip flop 33 having the input R connected to the signal OVP, and the input S connected to the signal Q-negated. Its output Q1 is applied to an input of an AND gate 34, and to the other input of the AND gate 34 the signal Q is applied. The output of the AND gate 34 is connected to the divider 17.

At the moment in which the control loop commands the turn-off of the transistor T, the output Q goes low and the output Q-negated goes high. This sets the flip-flop 33 and prepares the counter 17 for being zeroed at the beginning of the successive switching cycle, as soon as Q returns high. The positive front of Q-negated also activates the monostable 30 so that its output goes low for a preset time Td and, for all this time, the output of the AND gate 31 is kept low. When the time Td has passed, the output of the gate 31 goes high and this positive front activates the monostable 32 which releases a pulse of duration Ts that goes to the input of the gate 16. The output of the comparator 15 is present at the other input of this latter gate 16 and compares the voltage ZCD, proportional to that on Vaux, with reference Vth. If, therefore, ZCD<Vth, the voltage OVP of output of the gate 16, will remain low and the counter 17 is not increased; if instead, ZCD≧Vth, the voltage OVP will present a pulse lasting Ts that resets the flip-flop 33 placing Q1 low and will make the counting of the counter 17 go ahead by one. If this counting reaches N, then the signal F will go high and will activate the procedures of turn-off of the integrated circuit, otherwise it continues functioning.

At a certain point the transistor T is turned on again (by effect of a synchronism signal whose origin depends on the control modality made by the integrated circuit, for example also the same signal ZCD) and therefore Q goes high and Q-negated low. If in the previous cycle there had been a pulse of OVP (signaled by the fact that Q1 is low) the output of the gate 34 remains low and therefore the counter 17 is not zeroed; if, instead, in the previous cycle OVP remained low (signaled by the fact that Q1 is high), Q high zeroes the counter 17, whatever its counting is at that moment.

For the extension of this method to a boost type converter that operates as a pre-regulator PFC some explanations have to be made.

The voltage at the ends of the winding Vaux during the period in which the transistor T is off feels the effect of the input voltage. The signal taken from Vaux therefore gives the exact information on the output voltage only in correspondence with the zeroes of the mains voltage, while in all the other points supplies a lower voltage. It is as if the output voltage was sampled every half mains cycle (10 ms at 50 Hz).

It is therefore desirable to filter the information supplied by Vaux about the component caused by the instantaneous input voltage. In order to do it, another signal Vs can be used which, added to the signal detected $K_O \cdot V(\text{Vaux})_{OFF}$, annuls this component.

Indicated with n the ratio between the number of turns of the main winding of the inductor L and that of the auxiliary winding Vaux, the voltage that is present at the ends of Vaux during the period in which the transistor T is off is:

$$V(Waux)_{OFF} = \frac{1}{n}(Vout - Vpk\sin\theta), \quad (1)$$

That is:

$$V_{DET} = K_O V(Waux)_{OFF} + Vs \propto Vout. \quad (2)$$

That is:
replacing (1) in (2) it can be easily seen that:

$$V_{DET} = \frac{K_O}{n} Vout \quad (3)$$

$$V_S = \frac{K_O}{n} Vpk\sin\theta.$$

if and only if:

A signal proportional to the instantaneous mains voltage is directly available at the input pin of the multiplier (MULT):

$$V(MULT) = K_p Vpk \sin\theta. \quad (4)$$

If, therefore, at the signal detected $K_O \cdot V(Vaux)_{OFF}$ a signal $K_G \cdot V(MULT)$ is added where, as long as this is identified with Vs given by (3), $K_G$ fulfils the relation:

$$K_G K_P = \frac{K_O}{n}, \quad (5)$$

a signal will be obtained that is no longer dependant on the instantaneous input voltage which, compared with an internal reference $Vth_F$, can identify without delays a condition of overvoltage when:

$$V_{DET} = \frac{K_0}{n} Voutx = Vth_F. \quad (6)$$

Practically, it is not easy to sum a direct signal like V(COMP) to a sampled signal like $K_O \cdot V(Vaux)_{OFF}$, nevertheless it is seen that the condition of triggering the protection (6), subtracting Vs from both members, can be written:

$$\frac{K_0}{n} Voutx - Vs = Vth_F - Vs. \quad (7)$$

From one side, by definition, Vs is given by (3); from the other side is chosen to take $Vs = K_G \cdot V(MULT)$, therefore, replacing these two expressions respectively in the left and right members of (7), we can write:

$$\frac{K_0}{n} Voutx - \frac{K_0}{n} Vpk\sin\theta = Vth_F - K_G V(MULT),$$

that is, gathering in common factor and on the basis of the (1):

$$K_O V(Waux)_{OFF} = Vth_F - K_G V(MULT). \quad (8)$$

Thus, the voltage detected at the pin ZCD will be compared at every switching cycle no longer with a constant reference $Vth_F$ but with a reference $Vth = Vth_F - K_G VMULT$.

Figure 4:
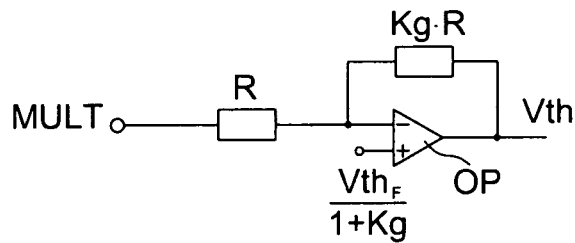
FIG. 4 shows a additional circuit to the block diagram of FIG. 1.

To the circuit of FIG. 3, in the case of implementation in a controller PFC, the circuit of FIG. 4, which makes the right member of the (8), may be added. It is an operational amplifier OP where the signal MULT is applied to a resistance of value R and then between the inverting input and the output of the amplifier OP, a resistance of value Kg·R is applied to the inverting input. A voltage equal to $Vth_F/(1+Kg)$ is applied to the non-inverting input. The output of the operational amplifier OP is the voltage Vth.

In practice, $Vth_F$ and $K_G$ are fixed inside the device and are known; n is chosen on the basis of other considerations (for example Vaux is often used for supplying the controller PFC by means of a charge pump) and can be considered known; Voutx is specified. To plan the protection the following steps are taken:

On the basis of the (6), the intervention threshold Vout=Voutx is set choosing the value of the partition ratio $K_O$:

$$K_O = n \frac{Vth}{Voutx}$$

On the basis of the (5) the polarization of the multiplier is chosen $K_p$ $$K_P = \frac{1}{n} \frac{K_O}{K_G} = \frac{1}{K_G} \frac{Vth_F}{Voutx}.$$

Figure 5:
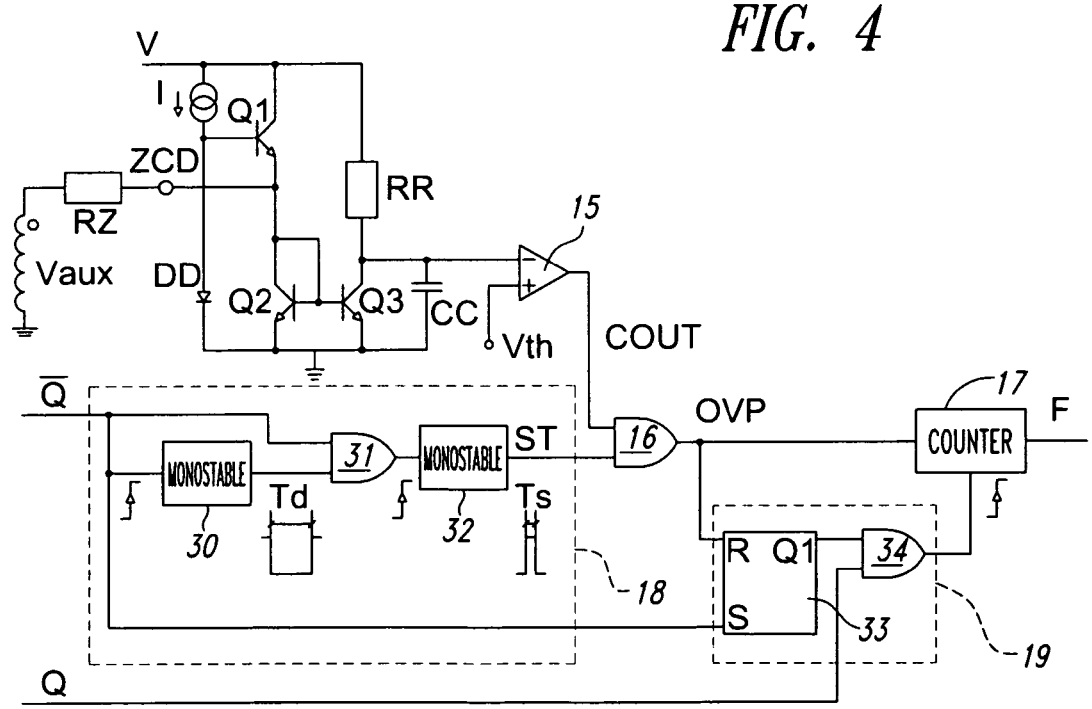
FIG. 5 shows a further possible circuit embodiment of the block diagram of FIG. 1.

Considering now the case in which the divider formed by R1 and R2 of FIG. 1 is not used, and only a resistance Rz as in FIG. 5 is used.

In the circuit of FIG. 5, in addition to what has already been described for FIG. 3, the terminal ZCD, instead of being applied to the filter 14, is applied to the emitter of a transistor Q1, that is connected to a current mirror formed by a transistor Q2 connected to diode and positioned between the emitter of Q1 and ground. A transistor Q3 and a resistance RR form the other side of the mirror and the collector of Q3 is connected to the non-inverting input of the comparator 15; the inverting input of the comparator 15 is connected to the voltage Vth. A capacitor CC is preferably positioned between the non-inverting input of the comparator 15 and ground.

The resistance RR and the collector of Q1 are connected to a supply voltage V. A current generator is also connected at this voltage that supplies this current to the base of the transistor Q1 and to the anode of a diode DD, whose cathode is connected to ground.

The voltage present at the terminal ZCD is internally limited upwards by the VBE of Q2 and Q3 and downwards to zero for turning on Q1. The current that enters Q2 during the turn-off period of the transistor T is measured by mirroring this current with Q3 and transforming said current in the drop in voltage on the resistance RR. The capacitor CC filters any noises present. A situation of overvoltage is then identified by the voltage at the inverting input of the comparator 15 being lower than the threshold Vth.

Figure 6:
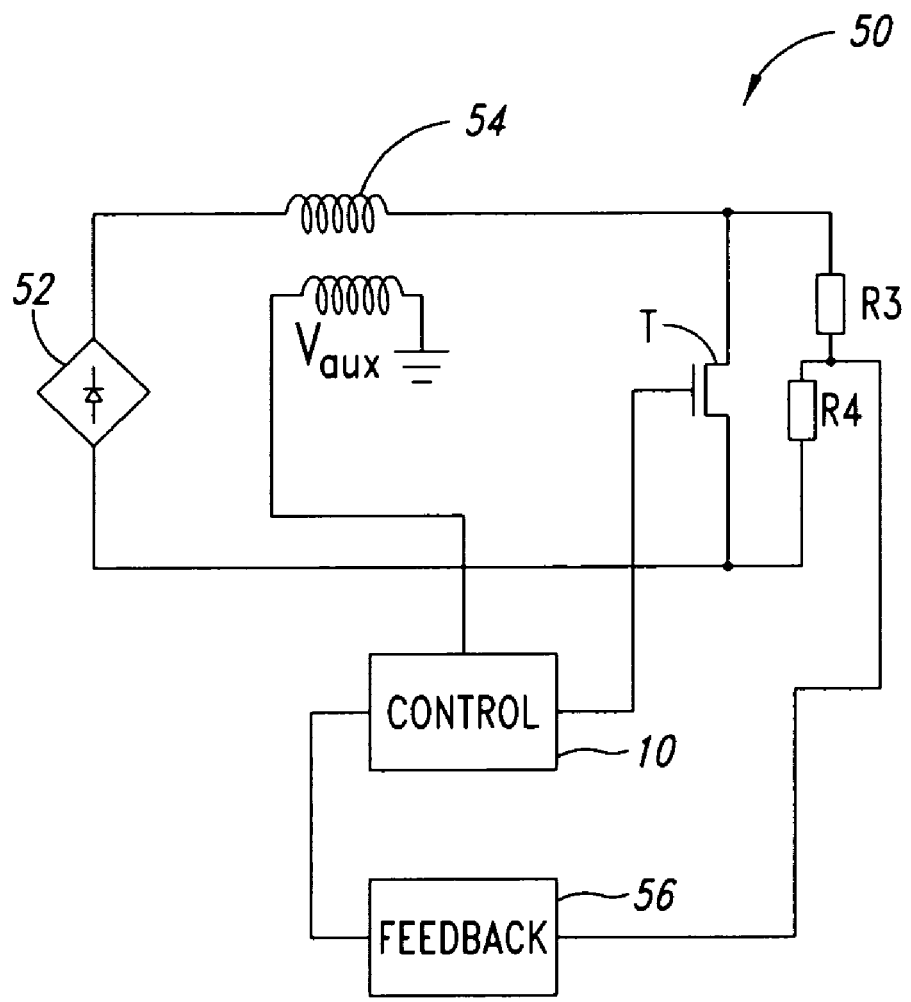
FIG. 6 is a schematic diagram of a switched power supply 50 according to one embodiment of the invention.

FIG. 6 is a schematic diagram of a switched power supply 50 according to one embodiment of the invention. The power supply 50 includes a rectifier bridge 52 that receives an input voltage from the mains and is connected to a primary coil 54 of a transformer. The primary coil is coupled to the power transistor T and to a voltage divider that includes resistors R3, R4. The transformer also includes the secondary coil Vaux that is coupled to the control circuit 10, as shown in FIG. 1. The power supply 50 also includes a feedback circuit 56 coupled from the intermediate node between the resistors R3, R4 to the control circuit 10.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A circuit for protecting against malfunctioning of a feedback loop of a switching power supply, the circuit comprising:

means for generating a voltage proportional to an output voltage of said switching power supply;

a comparator structured to compare said voltage proportional to the output voltage with a reference voltage;

a counter coupled to said comparator and structured to supply an output signal when said voltage proportional to the output voltage exceeds said reference voltage a threshold number of times greater than one; said output signal is indicative of a malfunctioning of the feedback loop.

2. A circuit in accordance with claim 1, further comprising:
a control circuit of said switching power supply where said control circuit supplies an activation signal that activates a power transistor or a deactivation signal that deactivates the power transistor; and
a delay circuit structured to connect an output of said comparator to an input of said counter after a first delay starting from said deactivation signal.

3. A circuit in accordance with claim 1, further comprising:
a control circuit of said switching power supply where said control circuit supplies an activation signal that activates a power transistor or a deactivation signal that deactivates the power transistor; and
a delay circuit structured to connect an output of said comparator to an input of said counter after a first delay starting from said deactivation signal and disconnecting the output of the comparator from the input of the counter after a second delay.

4. A circuit in accordance with claim 1, wherein said means for generating a voltage proportional to the output voltage comprise a divider of resistances connected to an auxiliary winding of the transformer of said switching power supply.

5. A circuit in accordance with claim 1, wherein said means for generating a voltage proportional to the output voltage comprise a resistance connected between an auxiliary winding of the transformer of said switching power supply and a current/voltage converter.

6. A circuit in accordance with claim 1, further comprising a zeroing circuit that zeroes said counter every time said voltage proportional to the output voltage is lower than said reference voltage.

7. A method for protecting against malfunctioning of a feedback loop of a switching power supply, the method comprising:
generating a voltage proportional to an output voltage of said switching power supply;
comparing said voltage proportional to the output voltage with a reference voltage;
counting how many times said voltage proportional to the output voltage exceeds said reference voltage; and
supplying an output signal, indicative of a malfunctioning of the feedback loop, when the counting has exceeded a threshold number that is greater than one.

8. A method in accordance with claim 7, further comprising supplying an activation signal that activates a power transistor or a deactivation signal that deactivates the power transistor, wherein counting how many times said voltage proportional to the output voltage exceeds said reference voltage occurs in a time window of between a first delay starting from said deactivation signal and a second delay.

9. A method in accordance with claim 7, wherein the counting step is made to start again every time said voltage proportional to the output voltage is lower than said reference voltage.

10. A switching power supply circuit, comprising:
a power transistor at which an output voltage is produced;
a feedback loop coupled to the power transistor;
a comparator structured to compare a voltage proportional to the output voltage with a reference voltage;
a counter coupled to the comparator and structured to supply an output signal when the voltage proportional to the output voltage exceeds the reference voltage a threshold number of times greater than one.

11. The circuit of claim 10, further comprising:
a control circuit that supplies an activation signal that activates the power transistor or a deactivation signal that deactivates the power transistor; and
a delay circuit structured to connect an output of the comparator to an input of the counter after a first delay starting from the deactivation signal.

12. The circuit of claim 10, further comprising:
a control circuit that supplies an activation signal that activates a power transistor or a deactivation signal that deactivates the power transistor; and
a delay circuit structured to connect an output of the comparator to an input of the counter after a first delay starting from the deactivation signal and disconnecting the output of the comparator from the input of the counter after a second delay.

13. The circuit of claim 10, further comprising:
a transformer having a primary winding and an auxiliary winding; and
a resistive divider coupled to the auxiliary winding and structured to supply the voltage proportional to the output voltage.

14. The circuit of claim 10, further comprising:
a transformer having a primary winding and an auxiliary winding;
a resistance connected between an auxiliary winding of the transformer of the switching power supply and the comparator; and
a current/voltage converter coupled to the resistance and the comparator.

15. The circuit of claim 10, further comprising a zeroing circuit that zeroes the counter every time the voltage proportional to the output voltage is lower than the reference voltage.

* * * * *